United States Patent [19]

Akio

[11] 4,402,738

[45] Sep. 6, 1983

[54] METHOD AND APPARATUS FOR INCINERATING SELF-BURNING WASTES

[75] Inventor: Harida Akio, Toyama, Japan

[73] Assignee: Y. Ichinose, Tokyo, Japan

[21] Appl. No.: 352,194

[22] Filed: Feb. 25, 1982

[30] Foreign Application Priority Data

Mar. 6, 1981 [JP] Japan .................................. 56-31701

[51] Int. Cl.³ .......................... C22B 1/248; F23B 5/00
[52] U.S. Cl. .................................... 75/44 S; 75/65 R; 75/68 R; 110/212; 110/213; 110/214
[58] Field of Search ............... 110/210, 211, 212, 214, 110/213, 345, 346; 75/44 S, 65 R, 68 R

[56] References Cited

U.S. PATENT DOCUMENTS

| | | | |
|---|---|---|---|
| Re. 31,046 | 10/1982 | Lombana et al. | 110/212 |
| 2,847,950 | 8/1958 | Naulin | 110/214 |
| 3,543,700 | 12/1970 | Baigas, Jr. | 110/213 |
| 3,610,179 | 10/1971 | Shaw, Jr. | 110/214 |
| 3,654,881 | 4/1972 | Bowles | 110/212 |
| 3,792,671 | 2/1974 | Woods | 110/212 |
| 3,807,321 | 4/1974 | Stockman | 110/212 |
| 3,861,335 | 1/1975 | Przewalski | 110/213 |
| 4,244,492 | 1/1981 | Beyerstedt et al. | 75/44 S |
| 4,319,921 | 3/1982 | Pryor et al. | 75/65 R |
| 4,334,484 | 6/1982 | Payne et al. | 110/214 |
| 4,341,199 | 7/1982 | Hand, Jr. et al. | 110/214 |

FOREIGN PATENT DOCUMENTS

| | | | |
|---|---|---|---|
| 969811 | 6/1975 | Canada | 110/212 |
| 1146661 | 4/1963 | Fed. Rep. of Germany | 110/212 |

*Primary Examiner*—Henry C. Yuen
*Attorney, Agent, or Firm*—Kanz & Timmons

[57] ABSTRACT

Disclosed are methods and apparatus for incinerating self-burning wastes by igniting the waste materials in a first chamber and limiting the supply of air in the first chamber to control the rate and temperature of combustion. The partially oxidized gasses produced in the first chamber are conducted to a second chamber through an elongated tube. Air is mixed with the partially oxidized gas in the elongated tube and the mixture ignited to complete combustion of the gasses in the tube and the second chamber. Metal wastes may be melted and recovered in the second chamber.

3 Claims, 9 Drawing Figures

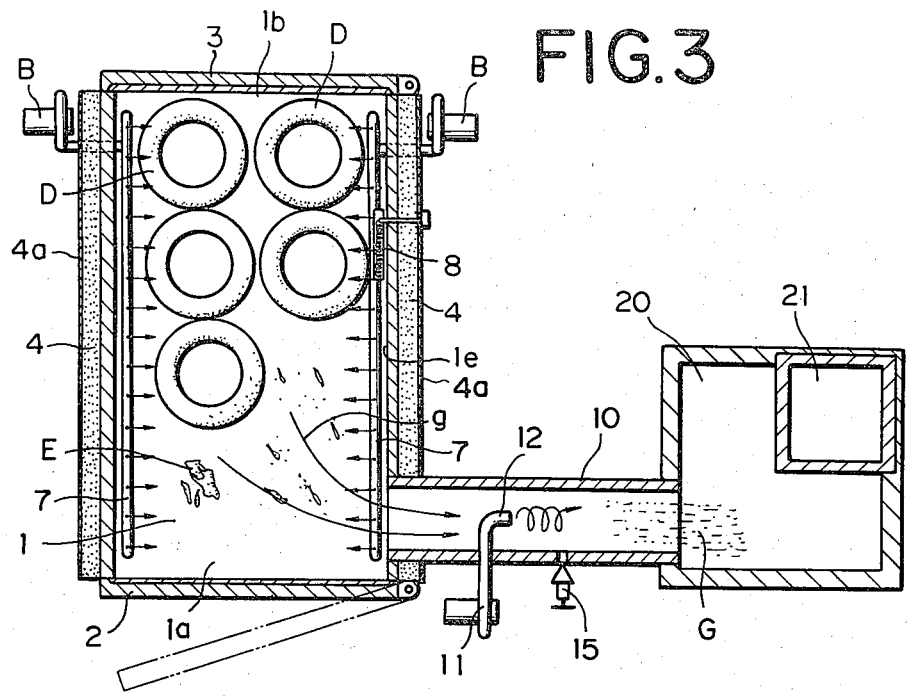
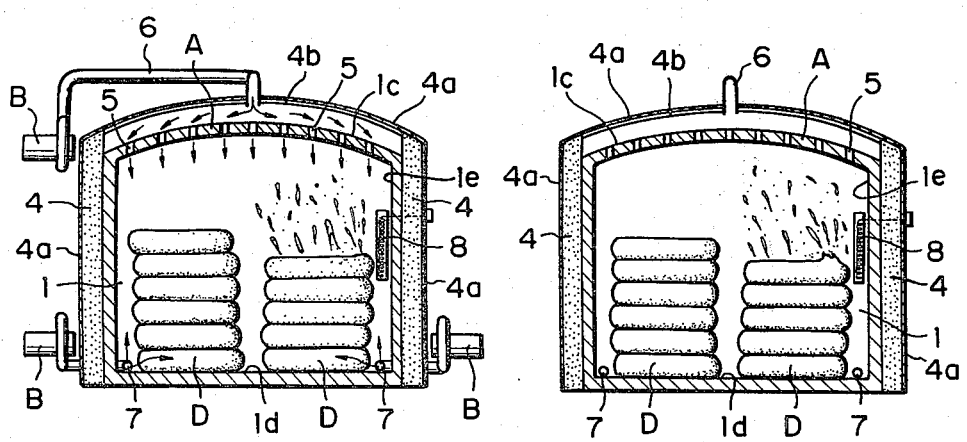

METHOD AND APPARATUS FOR INCINERATING SELF-BURNING WASTES

This invention relates to methods and apparatus for disposing of self-burning wastes characterized in that self-burning industrial wastes such as rubber products, tires made of petrochemical materials, products made of synthetic resins, etc., which burn spontaneously once ignited may be incinerated and disposed efficiently, inexpensively and without causing any contaminations.

As is well known in the art, the amount of tires which go to waste is annually increasing as the number of automobiles increases. Among such automobile tires, there are some which are made of synthetic rubber, and the tires usually include such other components as cord breakers, carcass and bead wires in addition to the rubber components. It is therefore extremely difficult to recover rubber alone from the used and discarded tires. Although some of such old and discarded tires are used as fish shelters or as play tools in gym fields and amusement parks, enormous amounts of old tires are presently either left in vacant lots or incinerated without recycling.

When incinerating self-burning wastes such as old and discarded tires and synthetic resin products which keep on burning once they are ignited, the wastes made mainly of natural rubber, synthetic rubber of petrochemical type or synthetic resins generate strong odors and a great deal of sooty smokes if burned outside, thereby contaminating the environment. On the other hand, if they are incinerated within a furnace, the furnace temperature becomes as high as 1600°–1800° C. and causes damages to the furnace. Because of the high temperatures involved, it is not practical to incinerate a great amount of wastes at one time, and, therefore, it is necessary to gradually feed wastes into the furnace while keeping a constant watch on how they burn.

There has been proposed a technique wherein an incinerator furnace is comprised of a first incineration chamber, a second incineration chamber, and a third incineration chamber, in which self-burning wastes are incinerated in a step-wise fashion with the wastes becoming completely incinerated without any contamination in the third incineration chamber. This three-step incineration system was, however, defective in that it increased the overall size of the incinerator system, complicated the structure and raised the cost.

SUMMARY OF THE INVENTION

The present invention was contrived in view of the above defects and offers incineration of wastes without causing any damages to the furnace and completes the incineration within a two-step incineration process where contamination of the environment does not occur by dividing the incineration furnace into two chambers, namely a first incineration chamber and the second incineration chamber. In the first incineration chamber the wastes are incompletely incinerated and the incomplete incineration gas is completely burned in the second chamber by mixing air with the incompletely oxidized gas in a smoke passage connecting the two chambers. In other words, the present invention eliminates the need for the third incineration chamber of the conventional art and employs a smoke tube structure connecting two furnace chambers to provide an inexpensive incineration furnace of simplified construction.

According to the present invention, there is offered an incineration furnace characterized in that it is provided with a relatively narrow and long smoke tube which laterally communicates between the side wall of a first incineration chamber and the side wall of a second incineration chamber, means to guide a great amount of combustion gas generated in the first incineration chamber into the said smoke tube, means to supply the required amount of air for complete combustion of the said combustion gas in the second incineration chamber, and means to mix the supplied air and the said combustion gas and exhaust the same to the second incineration chamber inside the said smoke tube.

BRIEF DESCRIPTION OF THE DRAWINGS

An incineration device provided with a smoke tube structure embodying the present invention is now explained in further detail, reference being made to the attached drawings in which:

FIG. 3 shows a horizontal cross-sectional view of the incineration device of FIG. 1 showing combustion of wastes;

FIGS. 4 and 5 are vertical cross-sectional views showing the first incineration chamber at the time of the initial period of incineration and as it is in a state of spontaneous incineration;

PREFERRED EMBODIMENT OF THE PRESENT INVENTION

Figure 1:
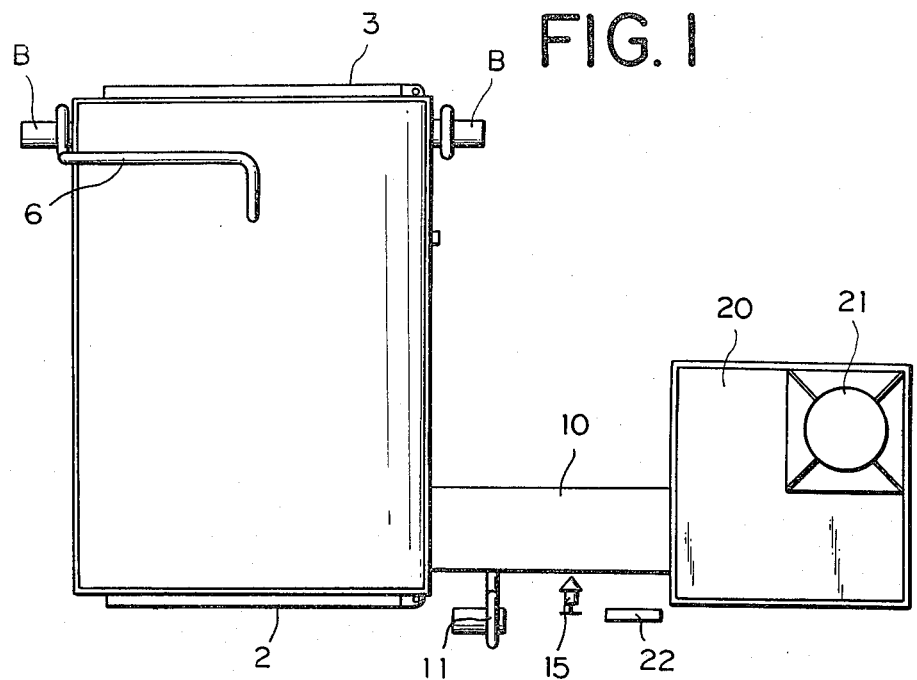
FIG. 1 shows a top plan view of one embodiment of an incineration device according to the present invention.
Figure 2:
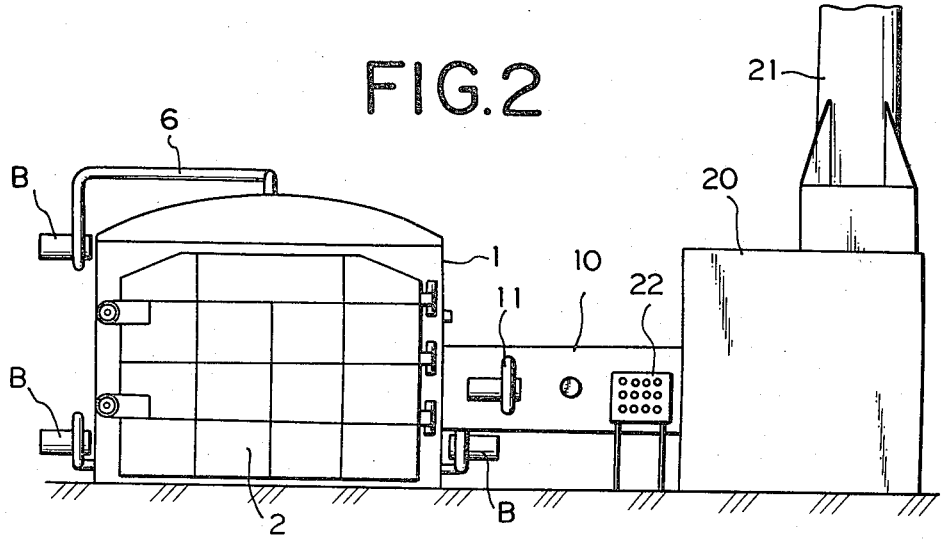
FIG. 2 is a front elevational view of the device shown in FIG. 1.
Figure 6:
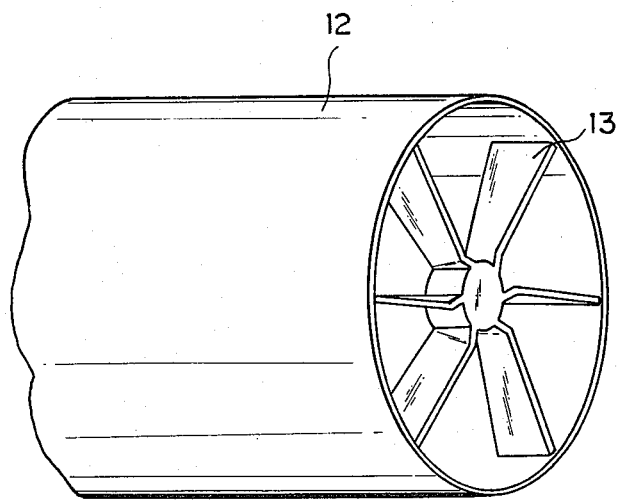
FIG. 6 is a perspective view of a nozzle for the air feeding device.
Figure 7:
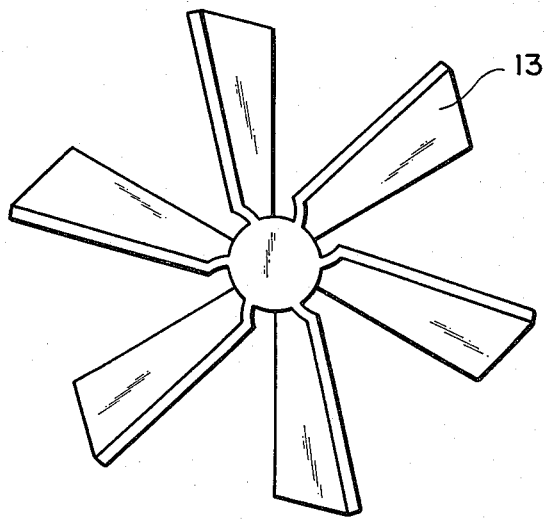
FIG. 7 shows one embodiment of vanes 13.

An incineration device embodying the present invention is now explained in further detail with references to FIGS. 1 through 7. In the drawings, the reference numeral 1 denotes a first incineration chamber 1 made of a fire insulation material A and having open ends 1a and 1b, the frontal open end 1a of incineration chamber 1 being provided with a front door 2 which may be opened and closed freely, and the rear open end 1b having a rear door 3 similar to the front door 2. There are provided bores 5 for ventilation penetrating the fire insulating material A which comprises the ceiling 1c of incineration chamber 1. While the said first incineration chamber 1 is covered with fire insulating material 4, an iron sheet 4a, and an auxiliary material 4b from the outside, an air feed port 6 for supplying air to the incineration chamber 1 through the ventilation bores of the ceiling 1c is joined to the iron plate 4a which covers the ceiling 1c, and air feeder pipes 7 are attached to the right and the left hand corners of the furnace floor 1d of the incineration chamber 1 (See FIG. 4). To the inside of the side wall 1e of the incineration chamber is attached a heater 8 for ignition purposes. A narrow and long cylindrical smoke tube 10 having a fire insulating structure for guiding the combustion gas G as well as not fully oxidized gas g generated in the first incineration chamber 1 is attached communicatingly between the side wall 1e of the first incineration chamber 1 and the side wall of the second incineration chamber 20. The said smoke tube 10 is provided with an air feeding member 11 for feeding the air dispersingly from the outside of the smoke tube 10 into the second incineration chamber 20.

Between the nozzle 12 of the air feeding member 11 and the second incineration chamber 20 is attached a small sized burner 15 which becomes activated as the temperature of the gas G and the gas g passing through the smoke tube 10 becomes lower than 800° or 700° C., and a smoke stack 21 is connected to the outlet port of the second incineration chamber 20.

The nozzle 12 of the air feeding member 11 which is inserted into the smoke tube 10 from the outside thereof is bent in the direction of the second incineration chamber 20 coinciding with the direction in which the gas G and the gas g are exhausted and further provided with vanes which act to disperse the air or cause turbulences, and to uniformly mix the gas G and the gas g which pass within the smoke tube 10 and the air which is supplied through the air feeding member 11.

In the drawings, the reference symbol B denotes a blower for supplying air to the air feed port 6 and the air feeder pipes 7. The reference number 22 denotes a power control panel for controlling the said blower B, the air feeding member 11, the small sized burner 15 and the ignition heater 8.

The incineration device in accordance with the present invention as constructed in the above manner is used for incinerating the self-burning wastes D by first opening the front door 2 for the first incineration chamber 1, inserting a great amount of wastes inside the first incinerating chamber 1 through the front open end 1a, closing the front door 2, and then activating the heater 8 until the wastes D in the incineration chamber 1 become self-burning. At the same time, air required for such incineration is supplied to the ventilation bores 5 in the ceiling from the air feeding pipes 7 provided on the left and the right hand corners of the bottom 1d of the combustion furnace and from the air feed port 6 provided on the iron sheet 4a of the ceiling 1c of the incineration chamber 1. The heater 8 is switched off and the air supply to the air feed port 6 and the air feeder pipes 7 is stopped when the wastes D become self-burning.

Although the first incineration chamber 1 becomes substantially air-tight once the above mentioned state is achieved, the wastes D keep on burning little by little from the top by the ignition heat and the small quantity of air which may be suctioned from the ventilation bores 5 of the ceiling 1c and the air feeder pipes 7 provided on the furnace floor 1d, and generate a large quantity of unoxidized gas g. However, since the flow of air into the first chamber 1 is limited, the combustion is incomplete. Therefore the combustion temperature is relatively low and the burning process continues slowly.

Oxidized gas G and unoxidized gas g generated by the low temperature combustion of wastes D in the first incineration chamber 1 are induced into the second incineration chamber 20 through a smoke tube 10 by the suction of the smoke stack 21 communicating with the first incineration chamber 1 via the smoke tube 10 and the second incineration chamber 20. Air feeding member 11 feeds air into the smoke tube 10 in the direction of flow of the gas G and the gas g.

As the gas G and the gas g are guided to the smoke tube 10 from the first incineration chamber 1, the air required for incinerating the unoxidized gas g is turbulently dispersed therein by the vanes 13 in the nozzle 12 of the air feeding member 11. The unoxidized gas g automatically becomes ignited if sufficient air required for incineration thereof is mixed therewith by the air feeding member 11 so long as the temperature of the gas g is higher than about 700° C. However, if the temperature of the gas g is lower at the start of the incineration, the gas does not automatically become ignited, and small sized burner 15 is activated to force ignition of the unoxidized gas g until the temperature of the gas g becomes high enough for self-sustaining ignition by the air fed from the air feeding member 11.

The gas g automatically ignited or ignited forceably in the smoke tube 10 burns as in a jet engine and flows into the second incineration chamber 20 instantly (in ca. 0.3 sec.) and becomes completely burnt or oxidized in the second incineration chamber 20. The oxidized gas is then exhausted through the smoke stack 21.

It is possible to utilize the said complete combustion in the said second incineration chamber to recover dissolved low melting point metals such as aluminum and its alloys contained in automobile engine parts and the like.

After the wastes D have become completely oxidized by burning little by little from the top inside the first incineration chamber 1, the air feeding member 11 for the air for the second incineration provided in the smoke tube 10 is stopped. The front and the rear doors 2 and 3 of the first incineration chamber may then be opened and the residue E of the wastes D either removed from the rear open end 1b or pushed forward by additional wastes D injected into the incineration chamber 1 through the front open end 1a. The front door 2 and the rear door 3 are then closed and the additional wastes D are then subjected to incineration as above outlined. In order for the wastes D in the first incineration chamber to become self-burning little by little, a small amount of air is needed. As the gas g generated in the first incineration chamber 1 is induced into the second incineration chamber 20 through the smoke tube 10, there is caused a negative pressure inside the first incineration chamber 1 and the small amount of air required for spontaneous burning is naturally suctioned through the air feed port 6 provided on the iron sheet 4a covering the ceiling 1c of the first incineration chamber 1 via the ventilation bores 5 made of a fire insulating material A comprising the ceiling 1c, or alternately through the air feeder pipes 7 provided on the furnace bottom 1d. Therefore, there is no need to supply the forced air from the air feed port 6 or the air feeder pipes 7, nor is it necessary to activate the heater 8 for ignition purposes.

Once the self-burning wastes D become ignited, they tend to burn vigorously by the ignition heat. However, if they reach the stage of spontaneous combustion, the forced air supply is stopped and the air volume required for combustion is limited to an amount which may be suctioned from the ventilation bores 5 and the air feeder pipes 7 so that the wastes D burn relatively slowly while generating a great quantity of unoxidized gas g.

The oxidized gas G and the great quantity of the unoxidized gas g which are generated in the first incineration chamber 1 are uniformly mixed with air as the air required for a complete combustion is supplied dispersingly or in turbulence from the air feeding member 11. Oxidation of the gas thus begins in the smoke tube 10, and the unoxidized gas g becomes completely oxidized in the second incineration chamber.

Figure 8:
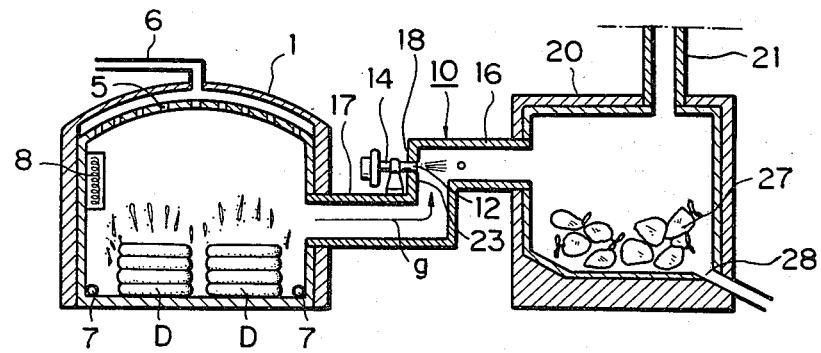
FIG. 8 is a cross-sectional view of an alternate embodiment of the invention.
Figure 9:
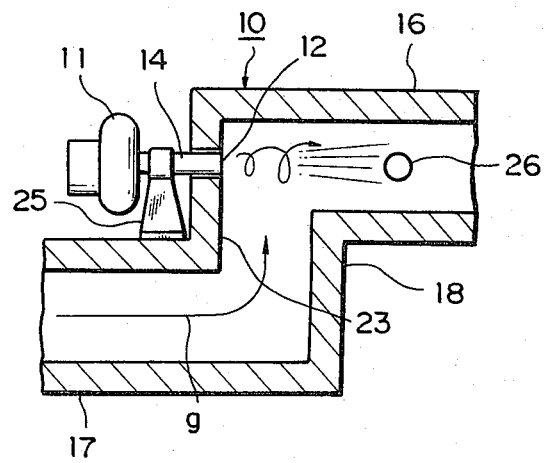
FIG. 9 is an enlarged sectional view of a portion of the connecting tube shown in the embodiment of FIG. 8.

Another embodiment of the invention is now explained in detail with reference to FIG. 8 and FIG. 9.

There is provided an alternatively designed smoke tube 10 between the two incineration chambers 1 and 20 which may be the same as discussed hereinabove with respect to FIGS. 1-7. The smoke tube 10 is so constructed that the front smoke tube 16 on the side of the second incineration chamber 20 is displaced in a plane higher than the rear smoke tube 17, thereby creating a stepped tube portion 18 between the front and the tubes 16 and 17. There is provided a through hole 24 on the peripheral wall 23 of the stepped tube portion 18 facing the first incineration chamber 1, the said through hole 24 being formed at the substantial center of the front smoke tube 16.

The nozzle 12 of the air feeding pipe 14 is inserted through the through hole 24, the said air feeding pipe 14 being linearly directed toward the second incineration chamber 20 and attached removably to support base 25. Air blower 11 is attached at the base thereof. It is preferable that the nozzle 12 is provided with vanes 13 and the air discharged into the tube under stirring conditions into the incompletely combusted gas. There is also provided a blow hole 26 attached with a burner in the front smoke tube 16 of smoke tube 10. This is for permitting the burner to ignite the incompletely combusted gas in the initial stage if it fails to become ignited by the blown air.

In the first incineration chamber 1, the reference number 8 denotes the ignition heater for the combustible wastes, 6 and 7 the air feeding pipes, and 5 the air vent hole. In the second incineration chamber 20, the number 21 denotes a smoke stack and 28 denotes an exhaust provided at the bottom of the chamber to discharge the melted metal for recovering aluminium and other metals from a waste engine 27 of an automobile or the like.

As explained heretofore, the incompletely combusted gas g generated in the first incineration chamber 1 passes through the smoke tube 10 and enters the second incineration chamber 20 to become mixed with the air blown in through the air feeding pipe 14 inside the smoke tube 10 and becomes completely combusted in the second incineration chamber 20. The smoke tube 10 is so constructed that the front smoke tube 16 and the rear smoke tube 17 are placed on different planes by providing a stepped portion 18 between the two tubes 16 and 17. As the nozzle 12 for the air feeding pipe 14 is inserted into the side peripheral wall 23 of the stepped portion 18 to blow the air toward the direction of the second incineration chamber 20, the pressure within the front tube 16 is reduced and the incompletely combusted gas is effectively suctioned from the rear smoke tube 17. As the incomplete combustion gas changes its direction inside the smoke tube 10, the air becomes blown in and mixes very well with the gas.

The nozzle 12 is inserted into the stepped tube portion 18 of the air feeding pipe 14 and therefore it is hardly exposed to the incompletely combusted gas or its accompanying heat, thereby limiting the damages and defects to which it might become subjected if it is extended inside the smoke tube 10. When checking for damages or defects, if any, the air feeding pipe 14 may be pulled out and replaced quite easily.

As explained heretofore, an incineration device embodying the present invention achieves the following:

(1) Gas containing a great quantity of unoxidized gas is generated in the first incineration chamber. This gas is introduced into the smoke tube by the air for the second incineration which is supplied to the second incineration chamber with an air feeder device provided in the smoke tube. The gas becomes mixed with the air and is self-ignited or becomes ignited by a burner provided in the smoke tube, and the gas is completely oxidized in the gasified state in the second incineration chamber as in the case of combustion in a jet engine. This phenomenon becomes remarkably effective if the smoke tube is made suitably elongated and narrow.

(2) In the conventional art, this type of incineration furnace absolutely requires a third incineration chamber. However, the present invention remarkably reduces the unpleasant odors and soots in the second incineration chamber. This is achieved because the incineration temperature in the second incineration chamber provided with the smoke tube structure in accordance with the present invention becomes about 200° C. -300° C. higher than usual because of the wind pressure from the air feeding member inside the smoke tube, thereby facilitating complete combustion without generating any smoke or odor. Therefore, the need for the third incineration chamber is completely eliminated. As mentioned above, the present invention does away with the third incineration chamber, thereby simplifying the overall structure of the incineration device and decreasing the cost of manufacture.

(3) By adjusting the air feeding member of the smoke tube, the temperature of the flame being blown into the second incineration chamber is set at about 1,000° C. for complete combustion of the gas, and by setting the temperature of the second incineration chamber at 700° C.-800° C., it is possible to recover the low melting point metals such as aluminium.

(4) As the present invention enables burning little by little of the self-burning wastes while generating a great quantity of unoxidized gas by controlling the air volume required for incineration after ignition, damage to the incineration chamber by excessive heat is prevented and particulate or sooty dusts do not fly about because of the forced air feeding as in the case of the conventional type devices where the wastes are burned directly and forceably.

(5) The smoke tube is so constructed to form a stepped portion between the front tube of the second incineration chamber and the rear tube of the first incineration chamber. A nozzle for the air feeding pipe is provided removably on the peripheral wall of the stepped portion so that damages and defects may be reduced while facilitating replacement of the nozzle as well as maintenance of the furnace itself.

While the invention has been described with particular reference to disposal of discarded tires and the like, it will be readily recognized that the principles thereof are equally applicable to oxidation of other waste materials which can be burned in a controlled environment providing partially oxidized gases. It is to be understood, therefore, that the forms of the invention shown and described in detail are to be taken as preferred embodiments thereof, and that various changes and modifications may be resorted to without departing from the spirit and scope of the invention as defined by the appended claims.

What is claimed is:

1. The method of incinerating oxidizable materials comprising:

(a) placing said oxidizable materials in an enclosed first chamber;
(b) heating said oxidizable materials while forcing air into said first chamber until said materials are ignited;
(c) venting the gas produced by partial combustion of materials in said first chamber into an elongated substantially horizontally extending tube connected with a second chamber;
(d) limiting the amount of air admitted to said first chamber to control the rate of combustion of said materials thereby producing partially unoxidized gas;
(e) mixing air with said partially unoxidized gas as said partially unoxidized gas passes through said elongated tube;
(f) maintaining the temperature of said partially unoxidized gas in said elongated tube at least about 700° C.;
(g) directing the flow of gas from said elongated tube into said second chamber;
(h) venting oxidized gas from said second chamber;
(i) placing materials containing metals in said second chamber;
(j) recovering molten metal from said second chamber; and
(k) directing a flame into said elongated tube to ignite the gasses therein.

2. The method set forth in claim 1 wherein said air is turbulently mixed with said gas in said elongated tube.

3. The method set forth in claim 1 wherein the temperature in said second chamber is maintained at about 700°-800° C.

* * * * *